United States Patent Office 3,772,211
Patented Nov. 13, 1973

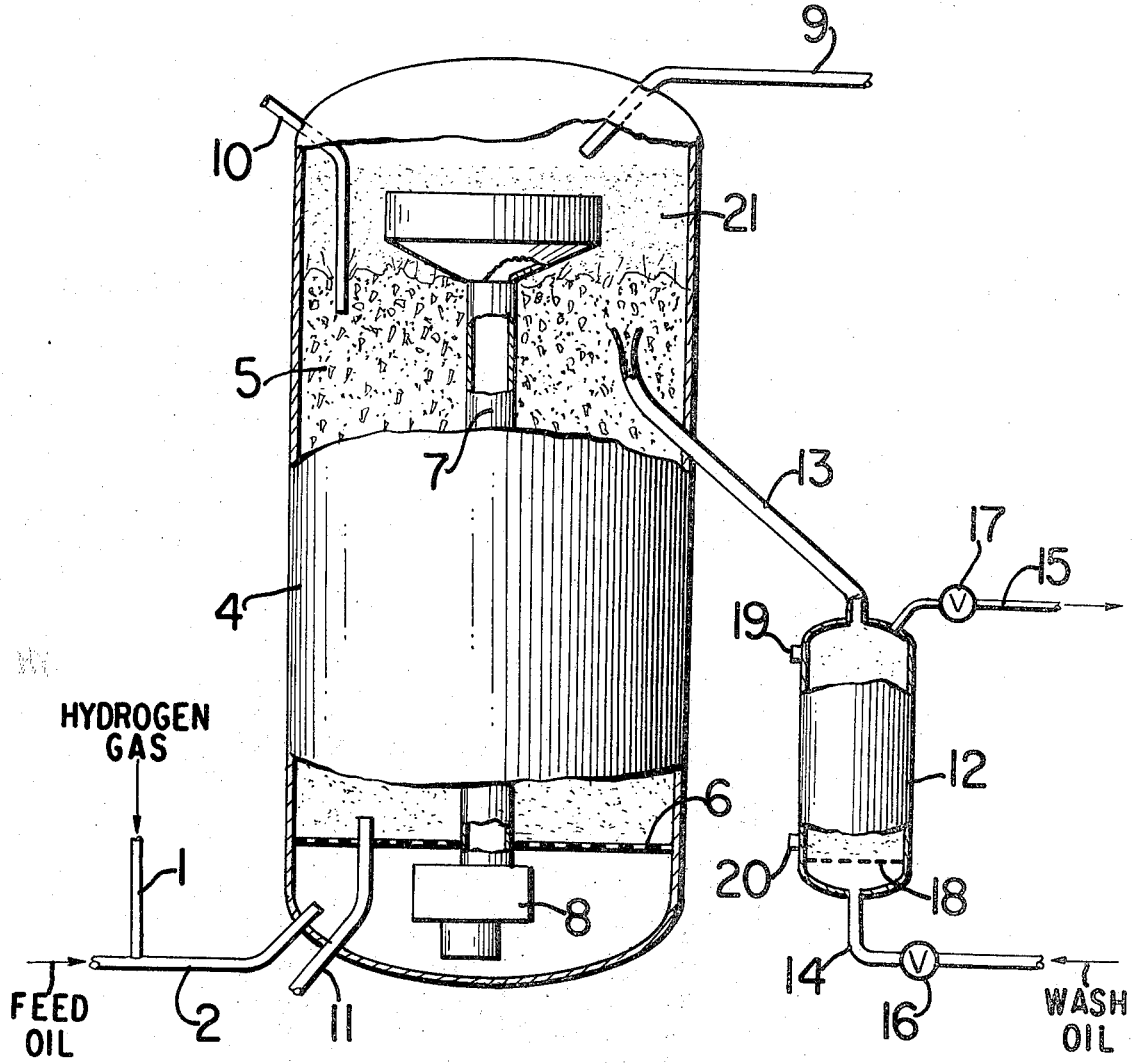

3,772,211
PROCESS FOR SEMI-CONTINUOUS REGENERATION OF CATALYST WITH WASH LIQUID IN A CLOSED SYSTEM
William R. Mounce, Cranbury, N.J., assignor to Cities Service Research and Development Company, New York, N.Y.
Filed Nov. 26, 1971, Ser. No. 202,414
Int. Cl. B01j 11/02
U.S. Cl. 252—414
10 Claims

ABSTRACT OF THE DISCLOSURE

A process for the semi-continuous regeneration of the poisoned catalyst in a closed, usually high pressure system. A portion of the catalyst which is maintained in an ebullated bed in a reactor, usually under high pressure, is allowed to flow by gravity to a catalyst wash vessel which is under essentially the same pressure as the reactor. A wash liquid is flowed upward through the catalyst in the wash vessel to wash deactivating material from the catalyst. On completion of catalyst washing, flow of the wash liquid is increased sufficiently to wash at least a portion of regenerated catalyst back into the reaction. The invention finds particular utility in a residual oil hydrocracking hydrodesulfurization process.

BACKGROUND OF THE INVENTION

This invention pertains to the field of particulate solid addition and withdrawal from closed reaction zones. More particularly, it pertains to the addition and removal of particulate catalysts or contact materials to zones where high pressure contacting of gaseous and liquid reactants with said solids takes place.

In various catalytic reactors and similar reaction systems, it is usually necessary from time to time to introduce a particulate solid, which may be a catalyst, to the reactor and, in due course, to remove the solid from the reactor. In fixed bed contacting systems, the addition and withdrawal of solids during the on-stream time of the reactor has not been feasible. With the advent, however, of the upflow, ebullated bed reactor, such as is disclosed in U.S. Pat. Re. 25,770, the addition and withdrawal of catalyst from the closed reaction zone has become an important factor with respect to the advantages of such systems.

In general, it is the normal procedure in ebullated bed systems to first build up a solids inventory in the reactor by a high addition rate and, after the desired solids level has been reached, to decrease the addition rate and to withdraw the solids from the zone at a rate equivalent to the addition rate such that the inventory and activity of the catalyst within the reaction zone remains constant. Thus, it is possible in such systems to continuously replenish the catalyst to thereby maintain its activity without shutdown to completely replace the catalyst.

It is readily apparent that it is desirable to maintain catalyst activity while at the same time reducing the rate of addition of fresh catalyst and removal of exhausted catalyst. Reducing the overall rate of utilization of expensve catalyst results in improved economics in the operation.

SUMMARY OF THE INVENTION

It is therefore an object of this invention to provide a process for the semi-continuous regeneration of poisoned particulate catalyst in a closed system wherein said catalyst is maintained in an ebullated bed.

It is another object of this invention to provide a process for the semi-continuous regeneration of poisoned particulate catalyst in a high pressure hydrocracking system wherein said catalyst is maintained in an ebullated bed.

It is a particular object of this invention to provide a process for the semi-continuous regeneration of poisoned particulate catalyst maintained in an ebullated bed in a high pressure hydrocracking system by removing deactivating coke-like material therefrom.

Still other objects will be apparent to those skilled in the art from the following description of this invention.

The foregoing objects are achieved in accordance with the practice of this invention. Broadly, this invention consists of a process for regenerating a deactivated particulate solid catalyst maintained in an ebullated bed and contained in a liquid material in a reaction zone in a closed system comprising:

(a) Allowing said particulate solid catalyst which has been poisoned by the deposition thereon of deactivating material to flow by gravity through a conduit from said reaction zone to a wash vessel which is under substantially the same pressure as said reaction zone;

(b) Passing a wash liquid upward through said catalyst in said wash vessel at a rate sufficient to wash deactivating material from said catalyst; and (c) Increasing the flow rate of said wash liquid sufficient to wash regenerated catalyst from said wash vessel through said conduit back to the reaction zone.

Thus, by the practice of this invention it is possible to regenerate poisoned, or deactivated, particulate catalyst maintained in an ebullated bed in a closed, preferably high pressure system on a semi-continuous basis. As a result, it is possible to maintain catalyst activity while at the same time reducing the rate of addition of fresh catalyst and removal of exhausted catalyst. The reduction in the overall utilization of catalyst results in improved economics in the operation of the system.

BRIEF DESCRIPTION OF THE DRAWING

The drawing depicts a schematic diagram of a catalyst wash vessel associated with a high pressure reactor.

DETAILED DESCRIPTION OF THE INVENTION

This invention is applicable to a broad variety of processes which require the addition and removal of a particulate solid material to a closed reaction system. It is particularly advantageous in closed, high pressure systems. Generally, such reaction systems are considered to be reaction vessels containing a particulate contacting agent which has catalytic activity and wherein a liquid feed is passed upward through the system usually along with a gaseous reactant at high temperatures and pressures. The contacting system is of the ebullated bed type where the upward flow of the liquid expands and fluidizes the particulate solid. The particular nature of the reaction system is not critical to the invention, but it is contemplated that the invention will have particular utility in residual oil hydrocracking processes. Additionally, it is immaterial whether fresh catalyst is added or exhausted catalyst withdrawn from the top or bottom of the reactor, although in the drawing, the mode disclosed is that where fresh catalyst is added at the top of the reactor and exhausted catalyst removed from the bottom.

While this invention is applicable to a wide variety of processes which require the regeneration of poisoned particulate solid catalyst maintained in an ebullated bed used in a closed, preferably high pressure reaction system, it will be described in particular with reference to a hydrocracking process wherein a liquid residual hydrocarbon oil and hydrogen are contacted at high temperature and under high pressure with a particulate catalyst in an ebullated bed. It is characteristic of a hydrocracking process that any sulfur present in the residual oil will be subjected to a hydrodesulfurization process wherein sulfur is reduced to hydrogen sulfide which is readily removed from the product. This is advantageous in that combustion of the product of the hydrocracking/hydrodesulfurization process will not emit appreciable amounts of air polluting oxides of sulfur. The residual hydrocarbon oil is an atmospheric or vacuum tower residual from, for example, crude petroleum, tar sands bitumen, or shale oil. The residual oil is characterized by containing at least 25 volume percent of a fraction boiling above 975° F. The process will best be understood by reference to the drawing.

Hydrogen gas under high pressure is fed through line 1 to pipe 2 through which is passed a hydrocarbon feed oil, usually a residual oil, which is to be subjected to hydrocracking. The hydrocarbon feed oil containing hydrogen gas is passed through pipe 2 to the bottom of high pressure reactor 4. The mixture of hydrocarbon feed oil and hydrogen gas pass upward through an ebullated catalyst bed 5 supported on grid plate 6 in reactor 4. The catalyst bed is ebullated by the upward passage of reactants. The mixture of reactants and products 21 above the ebullated catalyst bed may be recycled through the ebullated catalyst bed after passing downward through conduit 7 assisted by means of recycle pump 8. Product effluent is withdrawn through pipe 9. Fresh catalyst is added to the reactor through pipe 10 and exhausted catalyst removed from the reactor through pipe 11.

In the course of the hydrocracking process, the catalyst normally becomes coated with a deactivating coke-like material. It has been found that washing the catalyst with a gas oil, preferably an aromatic heavy gas oil, increases its activity by washing off the coke-like material. Regeneration of the poisoned catalyst by removal of the coke-like material makes possible a lower rate of change of catalyst, i.e., exhausted catalyst is removed through pipe 11 and fresh catalyst added to reactor 4 through pipe 10 at a lower rate than could be tolerated in the absence of catalyst regeneration.

Catalyst regeneration occurs in a catalyst wash vessel 12 which advantageously has approximately $\frac{1}{10}$ the volume of reactor 4. Catalyst wash vessel 12 is under substantially the same pressure as is reactor 4 and is connected thereto by conduit 13 which extends from the top of wash vessel 12 and passes through the wall of reactor 4 and extends upward to a point below the top of ebullated catalyst bed 5. The upper end of conduit 13 points upward and is open to permit catalyst to enter under the force of gravity and drop down to catalyst wash vessel 12 which is lower than the upper end of conduit 13. Wash oil passing through pipe 14 enters at the bottom of catalyst wash vessel 12 and may exit from the catalyst wash vessel through pipe 15. The flow of wash oil through line 14 is controlled by valve 16, and the flow of wash oil through line 15 and conduit 13 is controlled by flow control valve 17.

In the catalyst regeneration operation, the flow of wash oil through line 14 is reduced and valve 17 is adjusted to allow a very slow flow of wash oil through conduit 13 to thereby allow particulate catalyst from ebullated catalyst bed 5 to fall under the force of gravity through conduit 13 into catalyst wash vessel 12. Wash oil present in catalyst wash vessel 12 which is displaced by the particulate catalyst passes out of the wash vessel through pipe 15. Particulate catalyst entering catalyst wash vessel 12 rests on support grid 18. Fluid density meters 19 and 20 located at the top and bottom, respectively, of catalyst wash vessel 12 indicate whether the wash vessel is full or empty of the particulate catalyst. Once catalyst wash vessel 12 is full of particulate catalyst to be regenerated, valve 16 and valve 17 are adjusted so that wash oil entering the wash vessel through pipe 14 slowly passes upward through the catalyst contained therein and the major portion of the wash oil passes out of the wash vessel through pipe 15. However, inlet valve 16 and outlet valve 17 are so adjusted that, while the major portion of wash oil exits through pipe 15, a small amount passes upward through conduit 13 into reactor 4. Wash oil passing through conduit 13 serves the dual purpose of keeping the residual oil in reactor 4 from entering wash vessel 12 and also prevents excess catalyst from dropping down conduit 13 under the force of gravity.

Wash oil is passed upward through the catalyst in catalyst wash vessel 12 for a time sufficient to wash the coke-like material from the catalyst, usually a period of about 4 to 24 hours. After regeneration of the catalyst has been completed by washing of the deactivating coke-like material therefrom, valve 17 is closed and valve 16 is fully opened. The rapid flow of wash oil upward through the catalyst in wash vessel 12 expands and fluidizes the catalyst, carrying at least a portion of the regenerated catalyst through conduit 13 back into reactor 4. The regenerated catalyst rapidly become dispersed throughout ebullated catalyst bed 5 in reactor 4. The catalyst regeneration process may then be repeated using a fresh charge of deactivated particulate catalyst from the reactor 4.

While the instant invention is useful in the regeneration of poisoned particulate catalysts in closed systems generally, it is described herein with particular reference to a residual oil hydrocracking/hydrodesulfurization process. In practice, the hydrocracking reactor 4 is operated at a temperature of about 750°–900° F., preferably about 800°–850° F., and a pressure of about 1500–4000 p.s.i.g., preferably about 2000–3000 p.s.i.g. Accordingly, the catalyst wash vessel 12 is also maintained at a pressure of about 1500–4000 p.s.i.g. and preferably about 2000–3000 p.s.i.g. In this particular embodiment of the invention, it has been found to be advantageous to employ wash oil at a temperature of about 700°–750° F. It will be understood, however, that these temperatures and pressures are not limitative. It is required only that the catalyst wash vessel 12 be at substantially the same pressure as reactor 4 and the wash oil at a temperature sufficiently high to efficiently remove deactivating coke-like material from the catalyst and also close enough to the temperature within the reactor not to disturb the equilibrium therein. During the step where regenerated catalyst is being flushed from the wash vessel back to the reactor, it is sometimes advantageous to use a charge of relatively cold wash oil at a temperature as low as about 400° F. since its higher viscosity will be helpful in moving the catalyst.

As set forth above, the wash oil is advantageously a gas oil, preferably an aromatic heavy gas oil. The gas oil is not only an effective solvent for the coke-like material which deactivates the catalyst, but it is compatible with the residual oil in the hydrocracking reactor. In fact, the residual oil feed to reactor 4 through pipe 2 may, in some instances, contain a minor amount of a gas oil. While gas oils are well known to those skilled in the art, examples of especially suitable heavy aromatic gas oils are catalytic cracker cycle oil, catalytic cracker decant oil, coker gas oil, and lubricating oil extracts.

By this invention, a process is provided for the regeneration of a poisoned particulate catalyst used in a closed, preferably high pressure reactor system. It is anticipated that the instant invention will find particular utility in residual oil hydrocracking processes where particulate catalyst maintained in an ebullated bed and which has been poisoned by the deposition thereon of deactivating coke-like material may be regenerated by washing off the deactivating material and returning the regenerated catalyst to the reactor. Catalyst regeneration results in a higher average catalyst activity in the reactor. In addition, the process is characterized by economies resulting from a lower rate of addition of fresh catalyst and removal of exhausted catalyst, hence a lower overall rate of catalyst utility.

While this invention has been illustrated by the presentation of a specific embodiment thereof, it will be understood that the scope of the invention is limited only by the appended claims.

I claim:
1. A process for regenerating a particulate solid catalyst maintained in an ebullated bed and contained in a liquid material in a reaction zone in a closed system comprising:
   (a) allowing said particulate solid catalyst which has been poisoned by the deposition thereon of deactivating material to flow by gravity through a conduit from said reaction zone to a wash vessel which is under substantially the same pressure as said reaction zone;
   (b) passing a wash liquid upward through said catalyst in said wash vessel at a rate sufficient to wash deactivating material from said catalyst; and
   (c) increasing the flow rate of said wash liquid sufficient to wash regenerated catalyst from wash vessel through said conduit back to the reaction zone.

2. A process for regenerating a particulate hydrocracking catalyst contained in a liquid hydrocarbon material in a high pressure reaction zone and wherein said catalyst is maintained in an ebullated bed comprising:
   (a) allowing said particulate hydrocracking catalyst which has been poisoned by the deposition thereon of a coke-like material to flow by gravity through a conduit from said high pressure zone to a wash vessel which is under substantially the same pressure as said reaction zone;
   (b) passing a wash oil upward through said catalyst in said wash vessel at a rate sufficient to wash said coke-like material from said catalyst, the major proportion of said wash oil exiting from the system through a pipe at the top of said wash vessel and a minor proportion of said wash oil passing upward through the conduit connecting said wash vessel to said high pressure zone; and
   (c) closing the exit pipe at the top of said wash vessel while increasing the flow rate of wash oil sufficient to wash regenerated catalyst from said wash vessel through said conduit back to said high pressure reaction zone.

3. The process of claim 2 wherein hydrogen gas and a liquid hydrocarbon to be subjected to hydrocracking enter said high pressure reaction zone at the bottom thereof and pass upward through the particulate hydrocracking catalyst contained therein to thereby form an ebullated catalyst bed.

4. The process of claim 3 wherein the liquid hydrocarbon to be subjected to hydrocracking is a residual oil and wherein hydrocracked product is removed from the top of said high pressure reaction zone.

5. The process of claim 4 wherein the wash oil is a gas oil.

6. The process of claim 5 wherein the wash oil is an aromatic heavy gas oil.

7. The process of claim 6 wherein the volume of the wash vessel is about 1/10 that of the high pressure reaction zone.

8. The process of claim 7 wherein the temperature of the wash oil is approximately the same as the temperature within the high pressure reaction zone.

9. The process of claim 7 wherein the pressure within the high pressure reaction zone and the wash vessel is about 1500–4000 p.s.i.g., the temperature within the high pressure reaction zone is about 750°–900° F., and the wash oil is at a temperature of about 700°–750° F.

10. The process of claim 9 wherein the wash oil is at a temperature of about 700°–750° F. during catalyst washing step (b) and at a lesser temperature as low as about 400° F. during step (c) when regenerated catalyst is washed from the wash vessel back to said reaction zone.

References Cited
UNITED STATES PATENTS

| | | | |
|---|---|---|---|
| Re. 25,770 | 4/1965 | Johanson | 208—10 |
| 3,151,060 | 9/1964 | Garbo | 208—108 |
| 2,779,667 | 1/1957 | Keith | 23—288 S |
| 3,505,206 | 4/1970 | Decker | 252—414 |
| 3,505,207 | 4/1970 | Haney et al. | 252—414 |
| 3,328,292 | 6/1967 | Shambaugh | 208—120 |
| 3,645,887 | 2/1972 | Mounce | 208—108 |
| 3,523,888 | 8/1970 | Stewart et al. | 23—288 E |

DANIEL E. WYMAN, Primary Examiner

P. E. KONOPKA, Assistant Examiner

U.S. Cl. X.R.

23—288 B, 288 E; 208—108, 152, 157; 252—412